(12) United States Patent
Oota

(10) Patent No.: US 7,386,192 B2
(45) Date of Patent: Jun. 10, 2008

(54) PATTERN-MATCHING PROCESSING METHOD AND IMAGE PROCESSING APPARATUS

(75) Inventor: Akihiro Oota, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 968 days.

(21) Appl. No.: 10/632,583

(22) Filed: Jul. 31, 2003

(65) Prior Publication Data

US 2004/0022418 A1    Feb. 5, 2004

(30) Foreign Application Priority Data

Jul. 31, 2002    (JP)    ............... 2002-223819

(51) Int. Cl.
G06K 9/32    (2006.01)
G06K 9/00    (2006.01)
(52) U.S. Cl. .................. 382/300; 382/106; 382/154
(58) Field of Classification Search ................ 382/106, 382/154, 300
See application file for complete search history.

(56) References Cited

U.S. PATENT DOCUMENTS

| | | | | |
|---|---|---|---|---|
| 5,754,692 | A | * | 5/1998 | Kondo et al. ............... 382/216 |
| 6,381,360 | B1 | * | 4/2002 | Sogawa ....................... 382/154 |
| 6,853,738 | B1 | * | 2/2005 | Nishigaki et al. ........... 382/106 |
| 2001/0055063 | A1 | * | 12/2001 | Nagai et al ................. 348/116 |
| 2003/0059089 | A1 | * | 3/2003 | Quinlan et al. ............. 382/107 |
| 2003/0169931 | A1 | * | 9/2003 | Lainema ..................... 382/236 |

FOREIGN PATENT DOCUMENTS

| | | |
|---|---|---|
| JP | 62-282377 | 12/1987 |
| JP | 5-40828 | 2/1993 |
| JP | 11-55691 | 2/1999 |
| JP | 11-203476 | 7/1999 |
| JP | 11-234701 | 8/1999 |
| JP | 2000-283753 | 10/2000 |

(Continued)

OTHER PUBLICATIONS

Patent Abstract of Japan, Publication No. 11055691, published on Feb. 26, 1999, in the name of Hayashi Kazunori.

(Continued)

*Primary Examiner*—Bhavesh M. Mehta
*Assistant Examiner*—John B Strege
(74) *Attorney, Agent, or Firm*—Christie, Parker & Hale, LLP

(57) ABSTRACT

The present invention relates to a pattern-matching processing method based on left and right images of an object photographed in stereo. A left area and a right area are generated, each having a fixed pattern containing plural pixels extracted from the left and right images, respectively, and in the left area, a reference image is generated by calculating an interpolation pixel value to be used between two transversely adjacent pixels based on the average of the two pixel values, and by calculating an interpolation pixel value to be used between two vertically adjacent pixels based on the average of the plural pixel values surrounding the relating position. Similarly, in the right area, interpolation pixel values are calculated and a comparison image is generated. Then pattern matching is performed between the reference image and the comparison images generated sequentially by shifting the right original image pixel by pixel.

11 Claims, 8 Drawing Sheets

| $p_{11}$ | $a_{11}$ | $p_{12}$ | $a_{12}$ | $p_{13}$ |
|---|---|---|---|---|
| $g_{11}$ | $h_{12}$ | $g_{13}$ | $h_{14}$ | $g_{15}$ |
| $p_{21}$ | $a_{21}$ | $p_{22}$ | $a_{22}$ | $p_{23}$ |
| $g_{21}$ | $h_{22}$ | $g_{23}$ | $h_{24}$ | $g_{25}$ |
| $p_{31}$ | $a_{31}$ | $p_{32}$ | $a_{32}$ | $p_{33}$ |

FOREIGN PATENT DOCUMENTS

| JP | 2001-195571 | 7/2001 |
|---|---|---|
| JP | 2002-158867 | 5/2002 |

OTHER PUBLICATIONS

Patent Abstract of Japan, Publication No. 11234701, published on Aug. 27, 1999, in the name of Saneyoshi Keiji, et al.

Patent Abstract of Japan, Publication No. 2000283753 A, published on Oct. 13, 2000, in the name of Saneyoshi Keiji, et al.

Japan Office action dated Jun. 19, 2007 for corresponding priority JP 2002-223819 with English translation.

Patent Abstracts of Japan, Publication No. 05-040828, dated Feb. 19, 1993, in the name of Osamu Kawai.

English translation of JP 05-040828 listed above.

Patent Abstracts of Japan, Publication No. 11-203476, dated Jul. 30, 1999, in the name of Mitsuo Oshima.

Japanese Office action dated Feb. 19, 2008, for corresponding priority application JP 2002-223819, with English translation indicating relevance of references cited in this IDS.

Patent Abstracts of Japan, Publication No. 62-282377, dated Dec. 8, 1987, in the name of Toshiyuki Goto et al.

Patent Abstracts of Japan, Publication No. 2001-195571, dated Jul. 19, 2001, in the name of Michel Xavier et al.

Patent Abstracts of Japan, Publication No. 2002-158867, dated May 31, 2002, in the name of Shinichi Arasaki.

* cited by examiner

Fig.1A

| p₁₁ | a₁₁ | p₁₂ | a₁₂ | p₁₃ |
|---|---|---|---|---|
| b₁₁ | b₁₂ | b₁₃ | b₁₄ | b₁₅ |
| p₂₁ | a₂₁ | p₂₂ | a₂₂ | p₂₃ |
| b₂₁ | b₂₂ | b₂₃ | b₂₄ | b₂₅ |
| p₃₁ | a₃₁ | p₃₂ | a₃₂ | p₃₃ |

Fig.1B

| q₁₁ | c₁₁ | q₁₂ | c₁₂ | q₁₃ |
|---|---|---|---|---|
| d₁₁ | d₁₂ | d₁₃ | d₁₄ | d₁₅ |
| q₂₁ | c₂₁ | q₂₂ | c₂₂ | q₂₃ |
| d₂₁ | d₂₂ | d₂₃ | d₂₄ | d₂₅ |
| q₃₁ | c₃₁ | q₃₂ | c₃₂ | q₃₃ |

Fig.2A

| p₁₁ | p₁₂ | p₁₃ |
|---|---|---|
| p₂₁ | p₂₂ | p₂₃ |
| p₃₁ | p₃₂ | p₃₃ |

Fig.2B

| q₁₁ | c₁₁ | q₁₂ | c₁₂ | q₁₃ |
|---|---|---|---|---|
| d₁₁ | d₁₂ | d₁₃ | d₁₄ | d₁₅ |
| q₂₁ | c₂₁ | q₂₂ | c₂₂ | q₂₃ |
| d₂₁ | d₂₂ | d₂₃ | d₂₄ | d₂₅ |
| q₃₁ | c₃₁ | q₃₂ | c₃₂ | q₃₃ |

Fig.3A

| b₁₁ | b₁₂ | b₁₃ | b₁₄ | b₁₅ |
|---|---|---|---|---|
| p₂₁ | a₂₁ | p₂₂ | a₂₂ | p₂₃ |
| b₂₁ | b₂₂ | b₂₃ | b₂₄ | b₂₅ |

Fig.3B

| d₁₁ | d₁₂ | d₁₃ | d₁₄ | d₁₅ |
|---|---|---|---|---|
| q₂₁ | c₂₁ | q₂₂ | c₂₂ | q₂₃ |
| d₂₁ | d₂₂ | d₂₃ | d₂₄ | d₂₅ |

Fig.4A

| $p_{11}$ | $p_{12}$ | $p_{13}$ |
|---|---|---|
| $p_{21}$ | $p_{22}$ | $p_{23}$ |
| $p_{31}$ | $p_{32}$ | $p_{33}$ |

Fig.4B

| $d_{11}$ | $d_{12}$ | $d_{13}$ | $d_{14}$ | $d_{15}$ |
|---|---|---|---|---|
| $q_{21}$ | $c_{21}$ | $q_{22}$ | $c_{22}$ | $q_{23}$ |
| $d_{21}$ | $d_{22}$ | $d_{23}$ | $d_{24}$ | $d_{25}$ |

Fig.5

| $p_{11}$ | $a_{11}$ | $p_{12}$ | $a_{12}$ | $p_{13}$ |
|---|---|---|---|---|
| $e_{11}$ | $e_{12}$ | $e_{13}$ | $e_{14}$ | $e_{15}$ |
| $p_{21}$ | $a_{21}$ | $p_{22}$ | $a_{22}$ | $p_{23}$ |
| $e_{21}$ | $e_{22}$ | $e_{23}$ | $e_{24}$ | $e_{25}$ |
| $p_{31}$ | $a_{31}$ | $p_{32}$ | $a_{32}$ | $p_{33}$ |

Fig.6

| $p_{11}$ | $a_{11}$ | $p_{12}$ | $a_{12}$ | $p_{13}$ |
|---|---|---|---|---|
| $f_{11}$ | $f_{12}$ | $f_{13}$ | $f_{14}$ | $f_{15}$ |
| $p_{21}$ | $a_{21}$ | $p_{22}$ | $a_{22}$ | $p_{23}$ |
| $f_{21}$ | $f_{22}$ | $f_{23}$ | $f_{24}$ | $f_{25}$ |
| $p_{31}$ | $a_{31}$ | $p_{32}$ | $a_{32}$ | $p_{33}$ |

Fig.7

| $p_{11}$ | $a_{11}$ | $p_{12}$ | $a_{12}$ | $p_{13}$ |
|---|---|---|---|---|
| $g_{11}$ | $h_{12}$ | $g_{13}$ | $h_{14}$ | $g_{15}$ |
| $p_{21}$ | $a_{21}$ | $p_{22}$ | $a_{22}$ | $p_{23}$ |
| $g_{21}$ | $h_{22}$ | $g_{23}$ | $h_{24}$ | $g_{25}$ |
| $p_{31}$ | $a_{31}$ | $p_{32}$ | $a_{32}$ | $p_{33}$ |

Fig.8

| $p_{11}$ | $a_{11}$ | $p_{12}$ | $a_{12}$ | $p_{13}$ |
|---|---|---|---|---|
| $p_{21}$ | $a_{21}$ | $p_{22}$ | $a_{22}$ | $p_{23}$ |
| $p_{31}$ | $a_{31}$ | $p_{32}$ | $a_{32}$ | $p_{33}$ |

Fig.10A
(Prior Art)

| $p_{11}$ | $p_{12}$ | $p_{13}$ |
|---|---|---|
| $p_{21}$ | $p_{22}$ | $p_{23}$ |
| $p_{31}$ | $p_{32}$ | $p_{33}$ |

Fig.10B
(Prior Art)

| $q_{11}$ | $q_{12}$ | $q_{13}$ |
|---|---|---|
| $q_{21}$ | $q_{22}$ | $q_{23}$ |
| $q_{31}$ | $q_{32}$ | $q_{33}$ |

Fig.12

(Prior Art)

|     |     |     |
|-----|-----|-----|
| $X_1$ | $X_2$ | $X_3$ |
| $X_4$ | $X_5$ | $X_6$ |
| $X_7$ | $X_8$ | $X_9$ |

Fig.13A
(Prior Art)

| $X_{11}$ | $X_{12}$ | $X_{13}$ | $X_{14}$ | $X_{15}$ |
|---|---|---|---|---|
| $X_{21}$ | $X_{22}$ | $X_{23}$ | $X_{24}$ | $X_{25}$ |
| $X_{31}$ | $X_{32}$ | $X_{33}$ | $X_{34}$ | $X_{35}$ |
| $X_{41}$ | $X_{42}$ | $X_{43}$ | $X_{44}$ | $X_{45}$ |
| $X_{51}$ | $X_{52}$ | $X_{53}$ | $X_{54}$ | $X_{55}$ |

Fig.13B
(Prior Art)

| $X_{11}$ | $y_{11}$ | $X_{12}$ | $y_{12}$ | $X_{13}$ | $y_{13}$ | $X_{14}$ | $y_{14}$ | $X_{15}$ |
|---|---|---|---|---|---|---|---|---|
| $Z_{11}$ | $Z_{12}$ | $Z_{13}$ | $Z_{14}$ | $Z_{15}$ | $Z_{16}$ | $Z_{17}$ | $Z_{18}$ | $Z_{19}$ |
| $X_{21}$ | $y_{21}$ | $X_{22}$ | $y_{22}$ | $X_{23}$ | $y_{23}$ | $X_{24}$ | $y_{24}$ | $X_{25}$ |
| $Z_{21}$ | $Z_{22}$ | $Z_{23}$ | $Z_{24}$ | $Z_{25}$ | $Z_{26}$ | $Z_{27}$ | $Z_{28}$ | $Z_{29}$ |
| $X_{31}$ | $y_{31}$ | $X_{32}$ | $y_{32}$ | $X_{33}$ | $y_{33}$ | $X_{34}$ | $y_{34}$ | $X_{35}$ |
| $Z_{31}$ | $Z_{32}$ | $Z_{33}$ | $Z_{34}$ | $Z_{35}$ | $Z_{36}$ | $Z_{37}$ | $Z_{38}$ | $Z_{39}$ |
| $X_{41}$ | $y_{41}$ | $X_{42}$ | $y_{42}$ | $X_{43}$ | $y_{43}$ | $X_{44}$ | $y_{44}$ | $X_{45}$ |
| $Z_{41}$ | $Z_{42}$ | $Z_{43}$ | $Z_{44}$ | $Z_{45}$ | $Z_{46}$ | $Z_{47}$ | $Z_{48}$ | $Z_{49}$ |
| $X_{51}$ | $y_{51}$ | $X_{52}$ | $y_{52}$ | $X_{53}$ | $y_{53}$ | $X_{54}$ | $y_{54}$ | $X_{55}$ |

PATTERN-MATCHING PROCESSING METHOD AND IMAGE PROCESSING APPARATUS

CROSS REFERENCE TO RELATED APPLICATION

This application claims priority of Japanese patent application number 2002-223819, filed Jul. 31, 2002.

BACKGROUND OF THE INVENTION

1. Field of the Invention

The present invention relates to a pattern-matching processing method and an image processing apparatus. More particularly, the present invention relates to a pattern-matching processing method and an image processing apparatus that relates to a distance measuring system adopting image processing, and in which pattern matching is performed by generating left and right matching images to which pixel interpolation has been introduced from the photographed original images of an object taken by a stereo camera.

2. Description of the Related Art

Generally, the so-called stereoscopic distance measuring method is widely known as a three-dimensional measuring technique adopting image processing, in which correlation of a pair of left and right images of an object photographed from different positions by a stereo camera composed of two cameras is found and the distance is found from the parallax of the same object using image processing based on the principle of the triangulation using the camera parameters such as the position of the stereo camera and the focal length.

Such a distance measuring method is applied to, for example, distance measurement of an object located ahead of a vehicle such as a car. A stereo camera facing ahead is mounted in a vehicle and the distance to an object located ahead of the vehicle is measured based on the photographed stereoscopic images of the object ahead of the vehicle.

The distance information of an object calculated based on left and right images photographed by a stereo camera is sent to, for example, a vehicle control unit or a warning device, and is used to, for example, immediately stop the vehicle according to the measured distance or to inform the driver of the distance to the vehicle in the road ahead.

When such a stereoscopic distance measuring system is mounted in a vehicle, the system is usually equipped with a pattern-matching processing section, a distance measuring section, and an object recognition processing section for left and right images taken by a stereo camera.

In the pattern-matching processing section, left and right pattern-matching images in a small area are generated from the left and right original images taken by the stereo camera, and stereoscopic pattern matching is performed to find correlation between each other based on the left and right pattern-matching images.

Based on the matching results obtained by the stereoscopic pattern-matching processing, the difference between positions of pixels in the left and right original images (that is, the parallax) relevant to the object photographed is measured, and the distance from the stereo camera to the object is calculated using the measured parallax and the parameters relating to the camera.

Based on the generated distance data, whether the object photographed in the original image is, for example, a vehicle in the road ahead is judged. The result of the judgment is sent to a vehicle control unit that performs the vehicle traveling control, and so on, in order to support driving or to avoid danger.

By the way, the pattern-matching images generated in the pattern-matching processing section are composed of, for example, nine pixels, that is, a 3×3 pattern consisting of three transverse pixels and three vertical pixels, which are cut out respectively from the left and right original images photographed by the stereo camera.

When pattern matching is performed on these pattern-matching images, if it is assumed that the left original image is, for example, the reference image and the right original image is a comparison image, the right pattern-matching images, which are cut out from the right original image while being shifted pixel by pixel, are compared with the left pattern-matching image cut out from the left original image. At this time, a correlation coefficient of each pattern-matching image is calculated and the degree of matching is judged according to the magnitude of the correlation coefficient.

When it is judged that the left pattern-matching image and the right pattern-matching image match each other, the position of the central pixel in the left pattern-matching image of the left original image and the position of the central pixel in the right pattern-matching image of the right original image are found. The parallax in the transverse direction is found from the difference between the left pixel position and the right pixel position. In addition, the parallax in the vertical direction is also found in the same technique. If the parallax of the object viewed from the stereo camera can be found, it is possible to calculate the distance between the stereo camera and the object by reference to the parameters of the camera.

According to a technique using a technology in which, as described above, the three-dimensional position of an object ahead of a vehicle is measured, a matching position at which left and right pattern-matching images match each other is found by performing stereoscopic matching between the left and right pattern-matching images in small areas extracted from the left and right original images photographed in stereo, and the distance between the positions of pixels of the corresponding left and right pattern-matching images is output as a parallax.

As the parallax obtained by processing the stereoscopic images are expressed in the unit of pixels in the image, if a distance is calculated from the parallax expressed in the unit of pixels by using the triangulation, the resolution is degraded for longer distances to an object.

Because of the degradation of resolution, an error is produced in the calculated distance. This error is ascribed to the fact that the parallax detected from images photographed by a stereo camera is expressed in the unit of pixels and is also a main cause of the degradation of resolution in distance measurement based on the principle of the triangulation. This error commonly occurs in a case where other matching positions in images are found and may affect the judgment of an object in the object recognition section significantly.

Conventionally, as a consequence, resolution is improved to secure the accuracy in distance measurement by interpolating pixels in each left original image and right original image photographed in stereo, respectively, when pattern-matching processing is performed.

There are various known methods as a conventional pixel interpolation techniques. In one of them, pixel interpolation is performed based on eight pixels located adjacently to the pixel at the position to be interpolated. In this method, the pixel values of each of eight pixels adjacently surrounding the position to be interpolated are averaged and the resultant value is taken as a pixel value for the position to be interpolated. Then, for the whole of the original image, pixel interpolation is performed between two adjacent pixels successively.

This interpolation technique requires a tremendous amount of calculation because interpolated images are obtained after the interpolation pixel values to be interpolated are calculated for the whole of the original image. As a result, it takes a long time for the processing of interpolation; therefore, a more or less simplified interpolation technique is also adopted.

In the simplified pixel interpolation technique for obtaining an interpolated image, two adjacent pixels are selected, as basic interpolation processing, and an interpolation pixel is interpolated sequentially between the two adjacent pixels, with the average of the pixel values relating to the two pixels being taken as a pixel value for interpolation.

First, two transversely adjacent pixels in the original image are selected and a pixel is interpolated sequentially between the two adjacent pixels, with the average of the pixel values of the two pixels being taken as a pixel value for interpolation. This process, in which a pixel is interpolated between the two transversely adjacent pixels in the transverse row in the original image, is performed from the top of the original image to its bottom sequentially. After this, pixel interpolation is performed between two vertically adjacent pixels in the original image. By utilizing the interpolation pixels already interpolated between pixels in the transverse direction as well, pixel interpolation with the seven adjacent pixels is performed between the two vertically adjacent pixels in the original image. According to the pixel interpolation technique described above, interpolated images are obtained.

In this simplified interpolation technique described above, which has been adopted to obtain interpolation pixels, for two vertically adjacent pixels in the original image, the average value of the two adjacent pixels is taken as the interpolation pixel value and, as for the vertical direction, the average value of pixel values each of the seven adjacent pixels has is taken as the interpolation pixel value, with the already calculated interpolation pixels being also used, therefore, the amount of calculations required for the pixel interpolation technique is considerably reduced compared to the case where the pixel value of the position to be interpolated is obtained from the average value of eight adjacent pixels.

However, a distance measuring apparatus to be mounted in a vehicle is required to deliver as accurately and speedily as possible the distance measurement data to be supplied for driving support and warning and, therefore, there remains a problem that the amount of calculations is still large and much time is required, if the conventional or simplified pixel interpolation technique is used without changes made thereto for generating a pattern-matching image from a stereoscopic image.

The object of the present invention is, therefore, to provide a pattern-matching processing method and an image processing apparatus, in which pattern matching is performed by introducing pixel interpolation to the left and right pattern-matching images in small areas extracted from the photographed original images of an object taken by a stereo camera.

SUMMARY OF THE INVENTION

In order to solve the above-mentioned problem, the pattern-matching processing method according to the present invention comprises an area generating step for generating left and right areas that define a fixed range, respectively, from the left and right images photographed in stereo, a pixel generating step for generating an interpolation pixel between pixels contained in the left or right area, and a pattern-matching step for performing pattern matching on the left and right areas.

In the pattern-matching step, pattern matching is performed based on the left and right areas containing interpolation pixels, or pattern matching is performed based on the left area and the right area that has been interpolated with the interpolation pixels.

Moreover, in the pixel generating step, pixel interpolation is performed between two vertically adjacent pixels relating to the position to be interpolated, after pixel interpolation is performed on the left area and the right area that contain at the center the pixel, the matching position of which has been specified by pattern matching based on the left area and the right area, pixel interpolation is performed on the right area that contains at the center the pixel, the matching position of which has been specified by pattern matching based on the left area and the right area, or pixel interpolation is performed between two transversely adjacent pixels in the left area or the right area.

In addition, in the pixel generating step, after pixel interpolation is performed between two transversely adjacent pixels in the left area or the right area, pixel interpolation is performed between two vertically adjacent pixels at the position to be interpolated based on the average value of plural pixels surrounding the position to be interpolated, and when the average value is calculated, the plural pixels surrounding the position to be interpolated are weighted.

Then, in the pixel generating step, the average value is calculated by giving weight of a value less than 1 to the already interpolated pixels among the plurality of pixels surrounding the position to be interpolated, and pixel interpolation is performed starting from the pixel position at which the number of pixels surrounding the position to be interpolated is largest, which is the target for which the average value is calculated.

Moreover, in the pixel generating step, pixel interpolation is performed based on two pixels adjacent to each other only in the transverse direction in the left area and the right area.

The image processing apparatus according to the present invention is a stereoscopic distance measuring system that measures the distance to an object that is photographed in images by performing pattern-matching processing based on left and right images of the object photographed by a stereo camera, to which the above-described pattern-matching processing method has been applied.

According to the image processing apparatus of the present invention, the distance to an object ahead of a vehicle can be accurately detected, and the period of time required for pattern-matching processing for detection can be reduced and the distance information for driving support and warning can be provided both accurately and speedily.

BRIEF DESCRIPTION OF THE DRAWINGS

These and other objects and features of the present invention will become clear from the following description of the preferred embodiments given with reference to the attached drawings, wherein:

FIG. 1A and FIG. 1B are diagrams that illustrate examples of pattern matching of images interpolated with pixels according to a first embodiment of the present invention.

FIG. 2A and FIG. 2B are diagrams that illustrate examples of pattern matching of images interpolated with pixels according to a second embodiment.

FIG. 3A and FIG. 3B are diagrams that illustrate examples of pattern matching of images interpolated with pixels according to a third embodiment.

FIG. 4A and FIG. 4B are diagrams that illustrate examples of pattern matching of images interpolated pixels according to a fourth embodiment.

FIG. 5 is a diagram that illustrates an example of generating a pattern-matching image by using a first pixel interpolation technique according to the present embodiments.

FIG. 6 is a diagram that illustrates an example of generating a pattern-matching image by using a second pixel interpolation technique according to the present embodiments.

FIG. 7 is a diagram that illustrates an example of generating a pattern-matching image by using a third and a fourth pixel interpolation techniques according to the present embodiments.

FIG. 8 is a diagram that illustrates an example of generating a pattern-matching image by using a fifth pixel interpolation technique according to the present embodiments.

FIG. 10A and FIG. 10B are diagrams that illustrate examples of left and right images used for pattern matching.

FIG. 12 is a diagram that illustrates pixel interpolation in a conventional image processing.

FIG. 13A and FIG. 13B are diagrams that illustrate a conventional pixel interpolation based on adjacent pixels.

DETAILED DESCRIPTION OF THE INVENTION

In order to make the effects of the invention clearer, a general process of pattern-matching, relating to the present invention, will be explained below.

Figure 9:
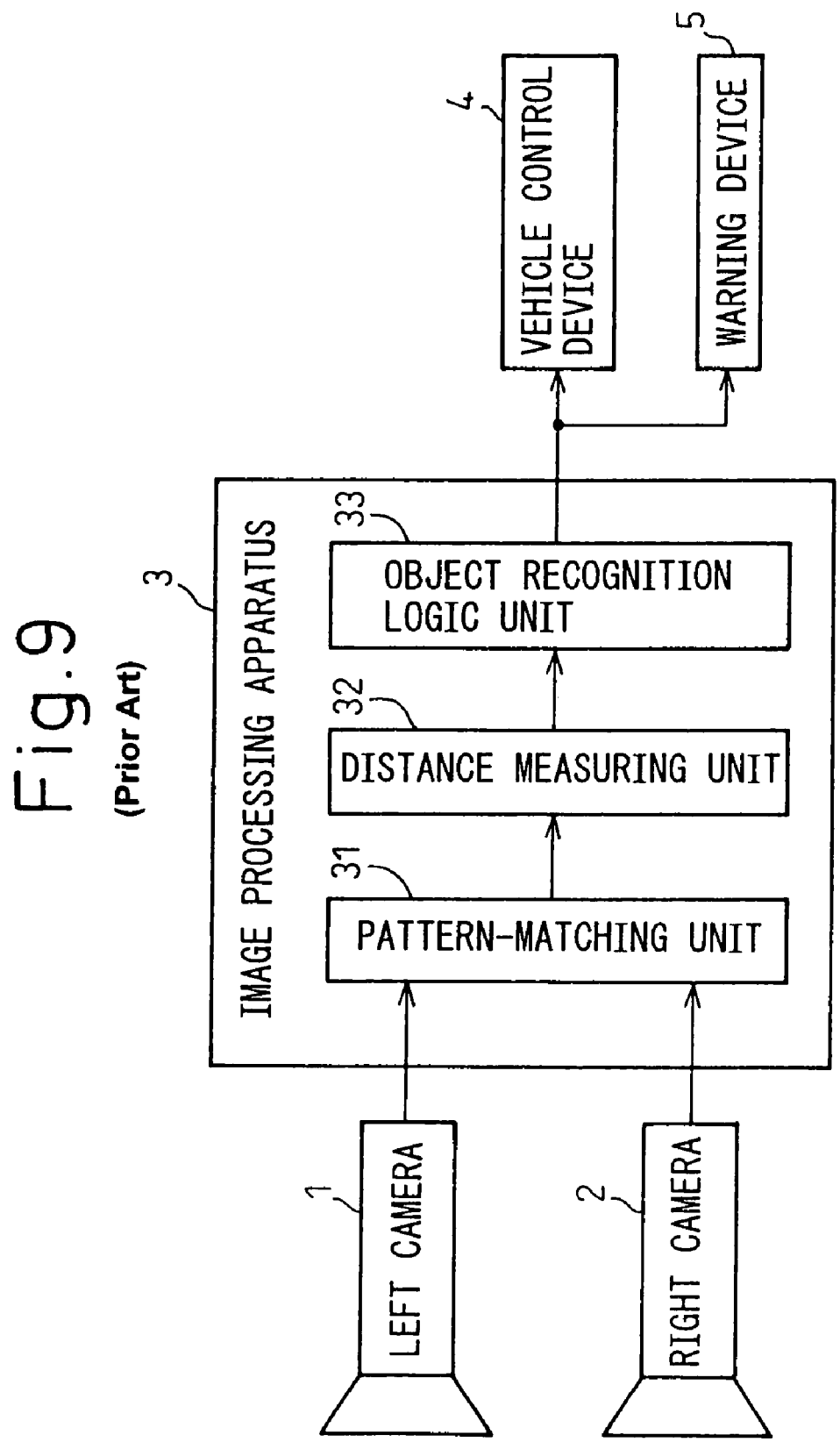
FIG. 9 is a diagram that illustrates a general block configuration of an image processing apparatus in a stereoscopic distance measuring system using left and right images.

An application example of a stereoscopic distance measuring method conventionally used is shown in FIG. 9. The example shown schematically is a case where a stereo camera facing forward is mounted in a vehicle such as a car and the distance to an object ahead of the vehicle is measured based on photographed stereoscopic images.

A stereoscopic distance measuring system comprises a stereo camera composed of a set of two cameras, a left camera 1 and a right camera 2, mounted so as to face forward, and an image processing apparatus 3.

The image processing apparatus 3 comprises a pattern-matching unit 31, a distance measuring unit 32 and an object recognition logic unit 33. FIG. 9 shows only the main parts for image processing, but there are provided, although not shown here, an image input unit that performs input processing on images of an object ahead of the vehicle photographed by the left camera 1 and the right camera 2, an original image memory that stores the photographed images processed in the image input unit as original images, a distance image memory that stores distance-related images generated by processing the original images, and so on.

The two cameras that constitute the stereo camera, that is, the left camera 1 and the right camera 2 are synchronized with each other and are CCD cameras, the shutter speed of which is variable, and one of the CCD cameras is used as a main camera that photographs a reference image for stereoscopic processing and the other is used as a sub camera that photographs a comparison image for stereoscopic processing, both having the same base line length and being arranged so that the their axes perpendicular to the image surface are parallel to each other.

The image input unit is provided with various functional circuits such as an amplifier for processing two-system analog photographed image signals from the cameras 1 and 2, respectively, and an A/D converter or the like for image processing, and moreover, it is further provided with an image adjusting circuit for electrically correcting slight deviations in the optical positions of the cameras 1 and 2. Therefore, in the image input unit, images photographed by the cameras 1 and 2 are converted into digital image data with a fixed gradation of luminance and are stored in the original image memory after errors in the mechanical mounting positions of each camera 1 and 2 are corrected by image adjustment.

The pattern-matching unit 31 is composed of various circuits and memories for processing such as an adder, a differentiator, an absolute value calculating circuit, and so on, and generates left and right pattern-matching images in small areas from a pair of original images, that is, a left image and a right image stored in the original image memory, and performs stereoscopic pattern-matching to find a mutual correlation according to each pattern-matching image.

The distance measuring unit 32 measures the distance between pixels (=parallax) in the original image, which is caused according to the distance to the photographed object, based on the matching result obtained in the pattern-matching unit 31, and generates the data of distance to the object photographed in the original image by reference to camera parameters.

The object recognition logic unit 33 judges whether the object photographed in the original image is, for example, the vehicle ahead based on the distance data generated in the distance measuring unit 32. The result of judgment is sent to a vehicle control device 4 that performs vehicle traveling control to support driving and avoid danger and, in addition, it is also sent to a warning device 5 that warns the driver of the distance to the vehicle ahead.

Examples of pattern-matching images are shown in FIG. 10, which are generated in the pattern-matching unit 31 in the image processing apparatus 3 configured as described above. In FIG. 10, a pattern-matching image, which is cut out from an original image photographed by a stereo camera for pattern-matching processing, is composed of nine pixels in a 3×3 pattern having 3 columns and 3 rows. FIG. 10A shows the pattern of a pattern-matching image cut out from the left original image photographed by the left camera 1, and FIG. 10B shows the pattern of a pattern-matching image cut out from the right original image photographed by the right camera 2. In these figures, each pixel corresponds one element in a grid.

If, for example, the left original image is used as a reference image and the right original image, as a comparison image, pattern-matching of these pattern-matching images is performed by comparing the pattern-matching image in FIG. 10A, which is cut out from the left original image, with the pattern-matching image in FIG. 10B, which is cut out from the right original image, each time being shifted pixel by pixel. Then, the correlation coefficient of each pattern-matching image is calculated and the degree of matching is judged according to the correlation coefficient.

Figure 11B:
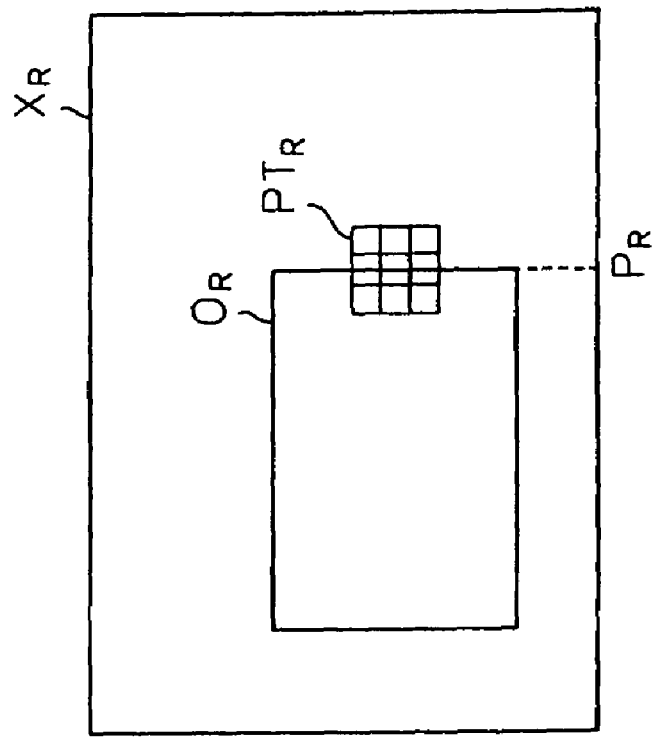
FIG. 11A and FIG. 11B are diagrams that illustrate how pattern matching is performed using left and right images.
Figure 11A:
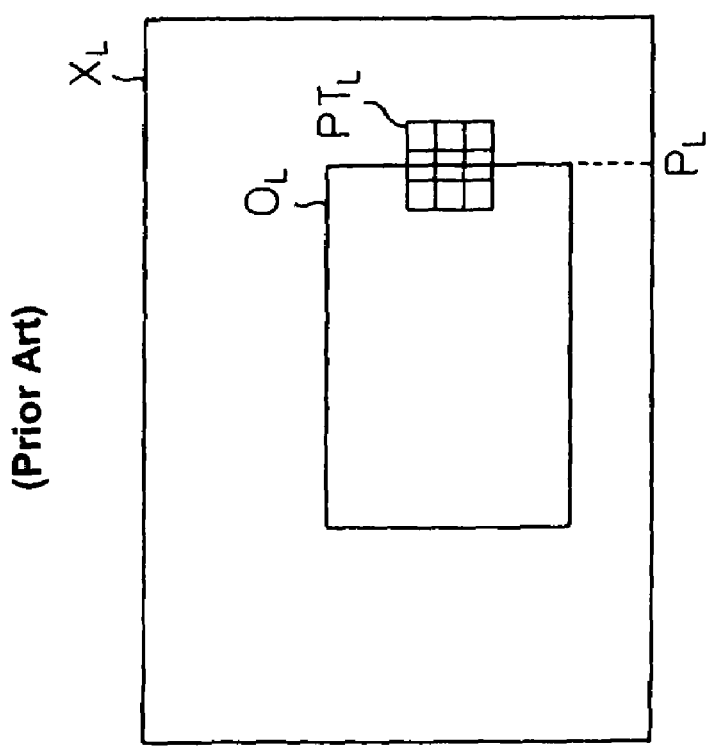

FIG. 11 shows how the degree of matching of each pattern-matching image is judged. In FIG. 11 also, a left original image $X_L$ is taken as a reference image and a right original image $X_R$, as a comparison image. These figures show a case where an object O ahead is photographed by a stereo camera; FIG. 11A shows the left original image $X_L$ photographed by the left camera 1 and FIG. 11B shows the right original image $X_R$ photographed by the right camera 2. In the left original image $X_L$, an object $O_L$ at the position viewed from the left camera 1 is shown and in the right original image $X_R$, an object $O_R$ at the position viewed from the right camera 2 is shown, respectively. As the object O is located a fixed distance ahead of the stereo camera, the positions of the object O in the images appear different.

Next, how to find the parallax between images by pattern-matching is described in an example of a case where the right end line of the object O is processed.

First, it is assumed that a pattern-matching image $PT_L$ can be extracted from the left original image $X_L$, which has a pixel on the right end line of the object $O_L$ as its center, for example, $p_{22}$ of the 3×3 pattern in FIG. 10A. Then, a pattern-matching image $PT_R$, the vertical position of which is the same as that of the pattern-matching image $PT_L$, is extracted from the right original image $X_R$. The next pattern-matching image $PT_R$ is extracted after the present pattern-matching image $PT_R$ having a 3×3 pattern is shifted each time pixel by pixel, for example, to the right in the transverse direction, while the vertical position is maintained unchanged.

Each time the pattern-matching image $PT_R$ is extracted after being shifted pixel by pixel, the correlation coefficient with respect to the pattern-matching image $PT_L$ is found based on the nine pixel values contained in the pattern-matching image $PT_R$. The position of the image, which has the least correlation coefficient among those obtained by shifting the pattern-matching image $PT_R$ pixel by pixel, is judged to match the pattern-matching image $PT_L$ in pattern.

When the pattern-matching image $X_L$ and the pattern-matching image $X_R$ are judged to match each other, a pixel position $P_L$ of the central pixel $p_{22}$ in the pattern-matching image $X_L$ in the left original image $X_L$ and a pixel position $P_R$ of a central pixel $q_{22}$ in the pattern-matching image $X_R$ in the right original image $X_R$ are found. According to the principle of finding a horizontal parallax, it can be found from the difference $(P_L-P_R)$ between the pixel position $P_L$ and the pixel position $P_R$. A vertical parallax can be found in the same manner. If the parallax of the object O viewed from the stereo camera can be found, the distance between the stereo camera and the object O can be calculated by reference to camera parameters.

According to the stereoscopic distance measuring method described above, the mutual matching position between the left and right pattern-matching images is specified by performing a stereoscopic matching on the left and right pattern-matching images in the small areas extracted from the left and right original images photographed in stereo, and the distance between pixels in the corresponding left and right pattern-matching images is output as a parallax.

However, the unit of the parallax obtained by processing stereoscopic images is a pixel in the images. Therefore, if a distance is measured by triangulation using a parallax expressed in units of pixels, resolution is degraded for far objects.

The resolution is described by reference to FIG. 11A and FIG. 11B. The position of the right end line of the object $O_L$ in the left original image $X_L$ is found as the pixel position $P_L$ and the position of the right end line of the object $O_R$ in the right original image $X_R$ is found as the pixel position $P_R$, and it is assumed that those positions are expressed by the number of pixels located to left thereof in the images as, for example, $P_L$=600 and $P_R$=500. Then, the parallax between the images is expressed as $P_L-P_R$=100.

Even though it is found that the distance calculated using the triangulation method based on the above-mentioned parallax corresponds to 10 m and the pixel position $P_L$ is 600, there is possibility that the position of the right end line of the object $O_L$ in the left original image $X_L$ is actually, for example, 600.5, and if this is the case, the parallax should be 100.5. However, the distance calculated based on this will be, for example, 9.8 m, resulting in occurrence of an error. Such an error is caused because the unit of the parallax obtained from the images photographed by a stereo camera is a pixel and, therefore, according to the principle of the triangulation, the resolution in distance measurement is degraded and the judgment on the object is considerably affected.

Conventionally, resolution is improved to maintain the accuracy in distance measurement by performing pixel interpolation on the left original image and the right original image photographed by a stereo camera, respectively, when pattern-matching processing is performed in the pattern-matching unit 31. The conventional pixel interpolation technique is described below by reference to FIG. 12 and FIG. 13.

Figure 12:
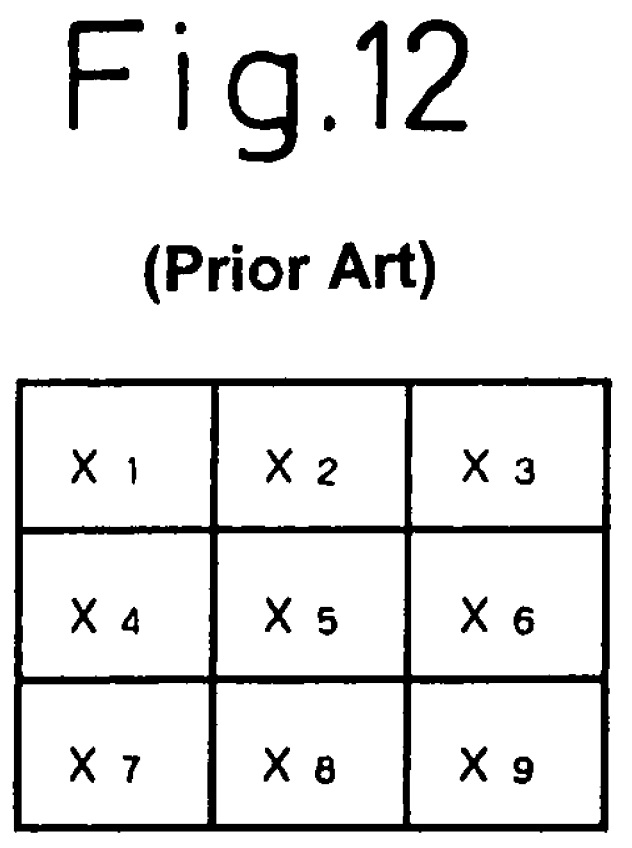

FIG. 12 shows a case where pixel interpolation is performed based on eight pixels adjacently surrounding the position to be interpolated. In this figure, the position to be interpolated is denoted by $x_5$ and eight pixels adjacently surrounding the position are denoted by $x_1$ to $x_4$, and $x_6$ to $x_9$ in the original image. When the position $x_5$ is interpolated with pixels, the pixel value of position $x_5$ is calculated based on the pixel values of the eight adjacent pixels and using the following expression $$x_5=(x_1+x_2+x_3+x_4+x_6+x_7+x_8+x_9)/8$$

Then, position $x_5$ is interpolated with the value. In some cases, each pixel may be weighted. According to this interpolation technique, pixel interpolation is performed sequentially between two adjacent pixels for the whole of the original image.

According to this interpolation technique, it takes a tremendous amount of time to find the interpolation pixel values, and as a result, interpolation processing requires a long time, therefore, a simplified interpolation technique is adopted, to deal with this problem, as shown in FIG. 13. FIG. 13A shows an example of an original image, but in this case it is assumed that the original image has 5×5 pixels for simplification of description. Pixels $x_{11}$ to $x_{55}$ are arranged. FIG. 13B shows an example of an interpolated image, in which an interpolation pixel has been interpolated between individual pixels that make up the original image shown in FIG. 13A. The interpolated image now has a 9×9 pixel array, which is the result of the interpolated pixels. In FIG. 13B, the original pixel to be interpolated with pixels is shown in a bold line frame and an interpolation pixel is shown in a thin line frame.

The pixel interpolation technique to obtain the interpolated image shown in FIG. 13B is as follows. First, an interpolation pixel is interpolated sequentially between two pixels arranged in the transverse direction in the original image. Regarding interpolation pixel $y_{11}$ to be interpolated between pixel $x_{11}$ and pixel $x_{12}$, the interpolation pixel value $y_{11}$ is obtained by the following expression $$y_{11}=(x_{11}+x_{12})/2$$

Then, regarding interpolation pixel $y_{12}$ to be interpolated between pixel $x_{12}$ and pixel $x_{13}$, interpolation pixel value $y_{12}$ is obtained by the following expression $$y_{12}=(x_{12}+x_{13})/2$$

In this manner, pixel interpolation is performed sequentially between two pixels adjacent to each other in the transverse direction in the original image from the top end to the bottom end.

After pixel interpolation has been performed between two pixels adjacent to each other in the transverse direction in the original image, pixel interpolation is performed between two pixels adjacent to each other in the vertical direction in the original image. First, regarding interpolation pixel $z_{11}$ to be interpolated between pixel $x_{11}$ and pixel $x_{21}$, interpolation pixel value $z_{11}$ is obtained by the following expression using already obtained transverse interpolation pixels $y_{11}$ and $y_{21}$ adjacent to pixel position $z_{11}$ $$z_{11}=(x_{11}+y_{11}+x_{21}+y_{21})/4$$

Then, regarding pixel position $z_{12}$ to be interpolated, interpolation pixel value $z_{12}$ is obtained by the following expression using already obtained interpolation pixels $y_{11}$, $y_{21}$ and $z_{11}$ $$z_{12}=(x_{11}+y_{11}+x_{12}+z_{11}+x_{21}+y_{21}+x_{22})/7$$

In this manner, pixel interpolation with seven adjacent pixels is performed between two pixels adjacent to each other in the vertical direction in the original image using the interpolation pixels already interpolated between pixels in the transverse direction. The interpolated image shown in FIG. 13B is obtained by performing pixel interpolation on the original image shown in FIG. 13A using the pixel interpolation technique described above.

According to the pixel interpolation technique shown in FIG. 12, the pixel value of the position to be interpolated is obtained from the average value of the eight adjacent pixels. Compared to this pixel interpolation technique, according to the pixel interpolation technique adopted in order to obtain the interpolated image shown in FIG. 13B, the average value of two adjacent pixels is taken as an interpolation pixel value to be interpolated between the two pixels adjacent to each other in the transverse direction in the original image, and the average value of seven adjacent pixels including the already calculated interpolation pixels is taken as an interpolation pixel in the vertical direction, therefore, the amount of calculations required for the pixel interpolation technique shown in FIG. 13B is small.

However, a distance measuring device to be mounted in a vehicle is required to be able to provide distance information for driving support and warning with high precision in measurement and also able to calculate as speedily as possible. When pattern-matching images are generated from stereoscopic images, if the conventional pixel interpolation technique is used without any changes made to it, there still remains a problem that the amount of calculations is large and much time is required.

According to the pattern-matching processing method and the image processing apparatus relating to the present invention, the period of time required for performing pattern-matching can be reduced by improving the pixel interpolation technique for the left and right images for pattern-matching in small areas extracted from the photographed original image of an object taken by a stereo camera, and by reducing the amount of time required for generating pattern-matching images.

Next, the embodiments of the pattern-matching processing system and the image processing apparatus according to the present invention are described below by reference to FIG. 1 to FIG. 8, using an example case where a pattern-matching processing is adopted, into which pixel interpolation for the photographed original images of an object taken by a stereo camera is introduced, in a stereoscopic distance measuring system.

In a conventional stereoscopic distance measuring system, prior to pattern-matching processing, left and right original images photographed by a stereo camera are turned into interpolated images with doubled resolution by performing pixel interpolation on the whole of the original images, and pattern matching is performed based on the left and right interpolated images. This pattern-matching processing requires a tremendous amount of calculations and time for generating interpolated images.

According to the pattern-matching processing in the first embodiment, which is applied to the stereoscopic distance measuring system relating to the present invention, the amount of calculations and the period of time required for generating interpolated images are reduced while the accuracy in distance is improved by generating pattern-matching images that have been interpolated with pixels and by performing pattern matching on the left and right pattern-matching images only when pattern matching is performed.

In the first embodiment, when pattern-matching processing is performed based on left and right original images photographed by a stereo camera, pixel interpolation is performed on small areas cut out for pattern matching, for example, patterns of 3×3, that is, nine pixels, as shown in FIG. 10A and FIG. 10B.

FIG. 1 shows examples of pattern-matching images after pixel interpolation has been performed on patterns of 3×3, that is, nine pixels, cut out from left and right original images. FIG. 1A shows a state in which pixel interpolation has been performed on nine pixels $p_{11}$ to $p_{33}$ in FIG. 10A, and FIG. 1B shows a state in which pixel interpolation has been performed on nine pixels $q_{11}$ to $q_{33}$, respectively. In the figures, the pixels that have been interpolated with pixels are shown in bold line frames.

The conventional pixel interpolation technique shown in FIG. 13B is adopted for generating the pattern-matching images shown in FIG. 1. First, the reference image for pattern-matching processing is generated by performing pixel interpolation between two transversely adjacent pixels, when nine pixels $p_{11}$ to $p_{33}$ are specified as a small area pattern shown in FIG. 10A. As a result, six interpolation pixels $a_{11}$ to $a_{32}$ are obtained. Next, from the average value of seven pixels based on nine pixels $p_{11}$ to $p_{33}$ and the already obtained six interpolation pixels $a_{11}$ to $a_{32}$, 10 interpolation pixels $b_{11}$ to $b_{25}$ in the vertical direction are obtained, and the left pattern-matching image shown in FIG. 1A is thus generated.

Moreover, regarding nine pixels $q_{11}$ to $q_{33}$ shown in FIG. 1B making up the comparison image, six interpolation pixels $c_{11}$ to $c_{32}$ in the transverse direction and 10 interpolation pixels $d_{11}$ to $d_{25}$ in the vertical direction are obtained in the same pixel interpolation technique, and the right pattern-matching image shown in FIG. 1B is generated.

After the left pattern-matching image and the right pattern-matching image are thus generated, pattern matching is performed on the 5×5 pixel patterns based on these images. In pattern matching, for example, pixels $p_{11}$, $b_{11}$, $p_{21}$, $b_{21}$, $p_{31}$, . . . , in the left pattern-matching image are compared with pixels $q_{11}$, $d_{11}$, $q_{21}$, $d_{21}$, $q_{31}$, . . . , in the right pattern-matching image, and each difference between corresponding pixel values is obtained, respectively. In this manner, each difference between corresponding pixel values is obtained for the whole of the 5×5 pixel patterns, and a correlation coefficient between the left and right pattern-matching images is found.

Next, three vertically adjacent pixels, which will be obtained by shifting the pattern by one pixel in the transverse direction, are cut out from the right original image and, based on these three vertically adjacent pixels and original pixels $q_{13}$, $q_{23}$ and $q_{33}$, interpolation pixels $c_{13}$, $d_{16}$, $c_{23}$, $d_{26}$ and $c_{33}$, though not shown here, are added to the right end of the right pattern-matching image shown in FIG. 1B. In this manner, a right pattern-matching image, which is composed of 5×5 pixel pattern containing the newly interpolated pixels, that is, $c_{11}$ to $c_{33}$, and which is shifted by one pixel from the previous image, is generated as the next comparison image. Then, pattern matching is performed between the left pattern-matching image shown in FIG. 1A, which is the reference image, and the right pattern-matching image newly generated, which is the next comparison image.

A new right pattern-matching image of 5×5 pixel pattern, which will be the next comparison image, is generated by performing pixel interpolation each time so that a 5×5 pixel pattern shifted by one pixel is generated sequentially in accordance with the 3×3 pixel pattern. Then, it is possible to judge that the right pattern-matching image, which has the least correlation coefficient in comparison between each right pattern-matching image and the left pattern-matching image, is best matched in the transverse direction and to specify the transversely matching position in the original image. In addition, regarding the vertical direction, if the right pattern-matching image of 5×5 pixel pattern, which includes interpolation pixels obtained by shifting the right pattern-matching image, which is the comparison image, by one pixel in the vertical direction, is generated sequentially, the vertically matching position can be specified.

In the pattern matching processing according to the first embodiment, as described above, the right pattern-matching image of 5×5 pixel pattern is generated sequentially by pixel interpolation during processing, therefore, the amount of calculations and the period of time required for pattern-matching processing can be reduced, with doubled resolution being achieved, compared to the case where the original image is just interpolated with pixels to achieve doubled resolution.

Although both the left and the right pattern-matching images shown in FIG. 1A and FIG. 1B are generated for the pattern-matching processing of the left and right 5×5 pixel patterns interpolated with pixels, according to the pattern-matching processing in the second embodiment, a 3×3 pixel pattern cut out from the left original image is used, without any changes being made to it, as the left pattern-matching image, that is, the reference image, and a 3×3 pixel pattern cut out from the right original image is interpolated with pixels so that a right pattern-matching image of 5×5 pixel pattern, which will be a comparison image, is generated. FIG. 2A shows the left pattern-matching image, which is the 3×3 pixel pattern cut out from the left original image without any changes made to it, and FIG. 2B shows the right pattern-matching image, which is a 5×5 pixel pattern interpolated with pixels. The pixel interpolation technique for generating the right pattern-matching image is the same as that shown in FIG. 1A and FIG. 1B.

In the pattern matching using the left and right pattern-matching images shown in FIG. 2A and FIG. 2B, 3×3, that is, nine pixels are used in the pattern-matching processing. Pixels $p_{11}$, $p_{21}$, $p_{31}$, . . . , $p_{32}$ in the left pattern-matching image are compared with pixels $q_{11}$, $q_{21}$, $q_{31}$, . . . , $q_{33}$ in the right pattern-matching image. By this comparison, correlation coefficients between the left and right pattern-matching images are found.

Next, interpolation pixels $c_{13}$, $d_{16}$, $c_{23}$, $d_{26}$ and $c_{33}$ are added in the same manner as that shown in FIG. 1A and FIG. 1B for generating a right patter-matching image, which will be the next comparison image. In this manner, a right pattern-matching image, which is a 5×5 pixel pattern shifted by one pixel and includes the newly added interpolation pixels, that is, a pixel pattern of pixels $c_{11}$ to $c_{33}$, is generated as the next comparison image. Then, nine pixels $p_{11}$, $p_{21}$, $p_{31}$, . . . , $p_{32}$ in the left pattern-matching image shown in FIG. 2A, which serves as the reference image, are compared with nine pixels $c_{11}$, $c_{21}$, $c_{31}$, . . . , $c_{13}$, $c_{23}$, $c_{33}$ in the right pattern-matching image, which has been newly generated and serves as the next comparison image. As a result, correlation coefficients can be found.

While a 3×3 pixel pattern of the left original image is used without any changes made to it as the left pattern-matching image serving as the reference image, regarding the right pattern-matching image, which serves as a comparison image, pixel interpolation is performed each time to generate the right pattern-matching image, which is a 5×5 pixel pattern serving as the next comparison image, so that a 5×5 pixel pattern shifted by one pixel is generated sequentially. Then, by the comparison between each right pattern-matching image and the left pattern-matching image, the right pattern-matching pattern image with the least correlation coefficient is judged to be matched in the transverse direction and the transversely matching position in the original image can be specified.

Regarding the vertical direction, the right pattern-matching image serving as a comparison image is shifted by one pixel in the vertical direction and the right pattern-matching image of 5×5 pixel pattern is generated sequentially as a result by using interpolation pixels $d_{11}$ to $d_{25}$. In this manner, the vertically matching position can be specified.

In the second embodiment, as described above, when pattern matching is performed, pixel interpolation is performed only for generating the right pattern-matching image serving as a comparison image and the right pattern-matching image of 5×5 pixel pattern is generated sequentially, therefore, it is possible to further reduce the amount of calculations and the period of time required for pattern-matching processing while achieving doubled resolution, because pixel interpolation is not performed for generating the left pattern-matching image, compared to the case where pixel interpolation is performed so that the original image achieves doubled resolution without any changes made to it.

In the pattern-matching processing according to the first and second embodiments, which have been described above by reference to FIG. 1 and FIG. 2, all of the pattern matching between the left and right pattern matching images is performed using the images interpolated with pixels. However, according to the third embodiment, in order to improve the efficiency of pattern-matching processing, after or if a mutually matching position can be approximately specified using normal 3×3 pixel patterns, a pattern-matching image is generated by performing pixel interpolation on peripheral pixels around the specified position, for example, a small area within a pixel distance of the specified position.

It is assumed that the pixel $q_{12}$ is specified as the matching position for the right pattern matching as a result when a normal pattern-matching processing is performed on the left and right 3×3 pixel patterns shown in FIG. 10A and FIG. 10B, which have been cut out from the left and right original images. However, even though it is assumed that the pixel $q_{12}$ is specified as the matching position, the resolution in matching remains unchanged as before and all that can be said is that the position has been specified approximately. If the position can be specified, the resolution can be increased and the efficiency of pattern-matching processing can be improved by generating pattern-matching images from interpolated images and performing pattern matching again only in the vicinity of the position.

FIG. 3A and FIG. 3B show the states in which left and right pattern-matching images have been generated, respectively, by performing pixel interpolation on small areas of 3×3 pixel region containing the pixel surrounding the position, after the position is specified approximately. FIG. 3A shows the left pattern-matching image and FIG. 3B shows the right pattern-matching image, respectively. FIG. 3 shows a case where matching is performed in the transverse direction.

The pixel interpolation technique for generating the left and right pattern-matching images shown in FIG. 3A and FIG. 3B, respectively, is the same as that in the case shown in FIG. 1. The pattern-matching images shown in FIG. 3A and FIG. 3B are generated based on the front and rear pixels in the transverse direction in accordance with pixel $q_{12}$ corresponding to the specified position. In the left pattern-matching image shown in FIG. 3A, the pixel corresponding to the specified position is $p_{22}$.

In matching between the left and right patterns, in the case where the left pattern-matching image shown in FIG. 3A is taken as the reference image, first nine pixels $b_{11}$, $p_{21}$, $b_{21}$, $b_{12}$, $a_{21}$, $b_{22}$, $b_{13}$, $p_{22}$ and $b_{23}$, which form the 3×3 pixel pattern of the left pattern matching image, are compared with nine pixels $d_{11}$, $q_{21}$, $d_{21}$, $d_{12}$, $c_{21}$, $d_{22}$, $d_{13}$, $q_{22}$ and $d_{23}$, which form a comparison image, that is, the 3×3 pixel pattern of the right pattern-matching image, and correlation coefficients are found.

Next, nine pixels $b_{11}$, $p_{21}$, $b_{21}$, $b_{12}$, $a_{21}$, $b_{22}$, $b_{13}$, $p_{22}$ and $b_{23}$, which form the 3×3 pixel pattern of the left pattern-matching image are compared with nine pixels $d_{12}$, $c_{21}$, $d_{22}$, $d_{13}$, $q_{22}$, $d_{23}$, $d_{14}$, $c_{22}$ and $d_{24}$, which form the right pattern-matching image, that is, the next comparison image, and correlation coefficients are found.

The second next comparison image is generated from the right pattern-matching image and correlation coefficients are found. Then, the next reference image is generated from the left pattern-matching image and matching is performed with the comparison images generated sequentially from the right pattern-matching image. In this manner, the matching position is specified by the least value among the obtained correlation coefficients.

As pattern matching is performed using the pattern-matching images interpolated with pixels on only the vicinity to the specified matching position, which has been obtained in a normal pattern matching using the 3×3 pixel patterns generated from the original image, the resolution can be improved without a large amount of calculation and time being required.

In generating the left and right pattern-matching images shown in FIG. 3A and FIG. 3B according to the third embodiment, pixel interpolation is performed on both the left pattern-matching image, which is the reference image, and the right pattern-matching image, which is a comparison image but, in the fourth embodiment shown in FIG. 4, the nine-pixel pattern cut out from the left original image, which is used in a normal pattern matching, is used as the left pattern-matching image, that is, the reference image without any changes made to it, as shown in FIG. 4A, and pixel interpolation is performed only on the right pattern-matching image, from which a comparison image is generated, as shown in FIG. 4B.

In the left and right pattern matching, nine pixels $p_{11}$, $p_{21}$, $p_{31}$, $p_{12}$, $p_{22}$, $p_{32}$, $p_{13}$, $p_{23}$ and $p_{33}$, forming the 3×3 pixel pattern of the left pattern-matching image, are first compared with nine pixels $d_{11}$, $q_{21}$, $d_{21}$, $d_{12}$, $c_{21}$, $d_{22}$, $d_{13}$, $q_{22}$ and $d_{23}$, forming the 3×3 pixel pattern of the right pattern-matching image, which is used as a comparison image, and correlation coefficients are found.

Then, while the left pattern-matching image, which is used as the reference image, is left as is, it is compared with nine pixels $d_{12}$, $c_{21}$, $d_{22}$, $d_{13}$, $q_{22}$, $d_{23}$, $d_{14}$, $c_{22}$ and $d_{24}$, which form the next comparison image shifted by one pixel in the right pattern-matching image, and correlation coefficients are found.

From the right pattern-matching image, the second next comparison image, the third one, and so on, are generated sequentially, and correlation coefficients are found. The position corresponding to the least value among thus obtained correlation coefficients is judged to be the matching position.

As pattern matching is performed using the pattern-matching images interpolated with pixels only for generating the comparison images in the vicinity of the specified matching position, which has been obtained by a normal pattern matching of the 3×3 pixel patterns generated from the original image, the amount of calculations and the period of time can be further reduced and the resolution can also be further improved compared to the pattern-matching processing shown in FIG. 3.

In the pattern-matching processing in the first to fourth embodiments described above, what is focused on is how to perform pixel interpolation on the pixel patterns cut out from the left and right original images when the left and right pattern-matching images are generated, and the applied pixel interpolation is basically the conventional pixel interpolation technique shown in FIG. 10. In the conventional pixel interpolation technique, the interpolation pixel value is a pixel value calculated by simply averaging the values of the peripheral pixels around the position to be interpolated with pixels. However, there is a possibility that the interpolation pixel value obtained by simply averaging the peripheral pixels according to the conventional pixel interpolation technique will not reflect the actual case.

Below is described the embodiments relating to the pixel interpolation technique in which the influence of errors due to pixel interpolation is lessened by improving the method for averaging peripheral pixels in the conventional pixel interpolation method.

FIG. 5 shows the case where a left pattern-matching image of 5×5 pixels is generated by applying a first pixel interpolation technique according to the present embodiment to the 3×3 pixel pattern cut out from the left original image shown in FIG. 10A.

The manner, in which pixel interpolation is performed between two transversely adjacent pixels in the 3×3 pixel pattern, is the same as the conventional pixel interpolation technique, that is, from the average value of pixel $p_{11}$ and pixel $p_{12}$, interpolation pixel $a_{11}$ is obtained, and in the same manner, interpolation pixels $a_{12}$ to $a_{32}$ are obtained sequentially in the transverse direction.

Then, pixel interpolation is performed between two vertically adjacent pixels in the 3×3 pixel pattern. In the conventional pixel interpolation technique, the interpolation start position to be interpolated with pixels is pixel position $e_{11}$ at the end of, for example, the pixel pattern shown in FIG. 5, but in the pixel interpolation technique according to the present embodiment, the start position at which pixel interpolation is performed between two vertically adjacent pixels is pixel position $e_{13}$. This is because, if interpolation is started from pixel position $e_{11}$, the number of pixels for averaging is small and, therefore, interpolation is stared from a position at which the number of pixels for averaging is large.

First, the pixel value to be interpolated to the pixel position $e_{13}$ is obtained from the following expression $$e_{13}=(a_{11}+p_{12}+a_{12}+a_{21}+p_{22}+a_{22})/6$$

Next, the pixel value to be interpolated to pixel position $e_{12}$ is obtained from the following expression $$e_{12}=(p_{11}+a_{11}+p_{12}+e_{13}+p_{21}+a_{21}+p_{22})/7$$

Next, the pixel value to be interpolated to pixel position $e_{11}$ is obtained from the following expression $$e_{11}=(p_{11}+a_{11}+e_{12}+a_{21}+p_{21})/5$$

Then, the pixel value for pixel position $e_{14}$ is obtained. In this manner, interpolation pixel values are calculated sequentially starting from the position at which the number of pixels for averaging is large. The same processing is applied to other pixel positions $e_{21}$ to $e_{25}$ in the transverse direction.

In the pixel interpolation technique according to the present embodiment described above, the interpolation start position at which pixel interpolation is performed between two vertically adjacent pixels is a pixel position at which the number of pixels for averaging is large. The average value is a simple average of plural pixel values, but in a second pixel interpolation technique, which is the next embodiment, the interpolation pixel values contained in the plural target pixel values for averaging are weighted in order to lessen the influence of errors due to interpolation pixels as significantly as possible. This is designed to suppress the influence of errors inherent in interpolation pixels because, if the pixels including interpolation pixels are used for averaging without any changes made to them, it means that these pixels are regarded as the actually existent pixels, as a result. A concrete example of a case, where the interpolation pixel values are weighted when calculated, is shown in FIG. 6.

FIG. 6 shows the case where the 3×3 pixel pattern of the left original image shown in FIG. 10A is interpolated with pixels, and the pixel interpolation between two transversely adjacent pixels is the same as that used to generate the left pattern-matching image shown in FIG. 5. The interpolation procedure for performing pixel interpolation between two vertically adjacent pixels is the same as that used to generate the pattern-matching image shown in FIG. 5. For example, the interpolation pixel value of pixel interpolation position $f_{13}$ is obtained from the following expression $$f_{13}=(a_{11}/2+p_{12}+a_{12}/2+a_{12}/2+p_{22}+a_{22}/2)/4$$

where interpolation pixel values $a_{11}$, $a_{12}$, $a_{21}$ and $a_{22}$ are assigned with a weight of ½. Due to the assignment of weight of ½, the number of pixels for averaging is decreased from six to four.

The assignment of weight of ½ adopted here is only an example. All that is required is the assignment of weight should decrease the values of pixels that really exist, and therefore the weight should be less than one.

In the second pixel interpolation technique, as described above, the contained interpolation pixel values are obtained by assigning a weight to the pixels that really exist in averaging for performing pixel interpolation between two vertically adjacent pixels and, therefore, the reliability of the pattern-matching processing of the generated pattern-matching images can be improved.

In the first and second pixel interpolation techniques described above, when pixel interpolation is performed between two vertically adjacent pixels, the average value of the eight peripheral pixels is used as the interpolation pixel value. Contrary to this, a third pixel interpolation technique, which will be described below by reference to FIG. 7, adopts a further simplified procedure for performing pixel interpolation between two adjacent pixels.

FIG. 7 shows the case where the 3×3 pixel pattern of the left original image shown in FIG. 10A is interpolated with pixels. The method for obtaining the interpolation pixels $a_{11}$, $a_{12}$, $a_{21}$, $a_{22}$, $a_{31}$ and $a_{32}$ between two transversely adjacent pixels is the same as that used to generate the left pattern-matching image shown in FIG. 5, but when pixel interpolation is performed between two vertically adjacent pixels in the left original image, for example, when pixel interpolation is performed between pixel $p_{11}$ and pixel $p_{21}$, interpolation pixel value $g_{11}$ is obtained from the following expression $$g_{11}=(p_{11}+p_{21})/2$$

In the same manner, the interpolation pixel values of interpolation positions $g_{13}$, $g_{15}$, $g_{21}$, $g_{23}$ and $g_{25}$ are obtained based on the pixels that really exist on the upper and lower sides thereof.

Next, when the interpolation pixel values of interpolation pixel positions $h_{12}$, $h_{14}$, $h_{22}$ and $h_{24}$ to be interpolated with pixels are obtained, the average value of the four pixels, which are located on the upper and lower sides of and to the left-hand and right-hand sides of each interpolation pixel position, is calculated. For example, when the interpolation pixel value of pixel position $h_{12}$ is obtained by calculation using the following expression $$h_{12}=(a_{11}+f_{11}+f_{13}+a_{21})/4$$

The interpolation pixel values of other pixel positions can be calculated in the same manner.

According to the third pixel interpolation technique, as described above, the period of time required for pattern-matching processing can be reduced compared to the first and second pixel interpolation means, because a technique of averaging four, that is, the upper, lower, left and right pixels, is adopted instead of a technique of averaging eight peripheral pixels for pixel interpolation between two vertically adjacent pixels in the original image.

Moreover, it is possible to introduce the idea of weighted averaging used in the second pixel interpolation technique shown in FIG. 6 into the third pixel interpolation technique for generating the pattern-matching image shown in FIG. 7 to establish a fourth pixel interpolation technique. In the fourth pixel interpolation technique, it is designed so that errors are avoided in averaging when the interpolation pixel values of interpolation pixel positions $h_{12}$, $h_{14}$, $h_{22}$ and $h_{24}$ are obtained by assigning specified weights, because the upper, lower, left and right pixels are interpolation pixels that do not really exist.

For example, the weight is assumed to be ½, the interpolation pixel value of pixel position $h_{12}$ can be obtained by the following expression $$h_{12}=(a_{11}/2+f_{11}/2+f_{13}/2+a_{21}/2)/2$$

The interpolation pixel values relating to other pixel positions can be obtained in the same procedure.

In the first to fourth pixel interpolation techniques described above, the left and right pattern-matching images are generated by performing pixel interpolation between two pixels among nine pixels making up the 3×3 pixel patterns shown in FIG. 10A and FIG. 10B, which have been cut out from the left and right original images photographed by a stereo camera.

However, when the original image photographed by a stereo camera is photographed by the interlaced scanning method, pixels are arranged in the transverse direction at every two vertical pixel positions in the original image in a frame. In other words, the next pixel row is photographed in the next frame, therefore, the period of time required for two frames is necessary to obtain the transverse pixel arrays corresponding to a display image of the original image. A fifth pixel interpolation technique is one in which pixel interpolation is performed using only the transverse components, without using the vertical pixel components, when detection accuracy is not required in the vertical direction in the original image. An example of generation of the left pattern-matching image according to the fifth pixel interpolation technique is shown in FIG. 8.

In the fifth pixel interpolation technique, pixel interpolation is performed only between two transversely adjacent pixels in one of the original image photographed by the interlaced scanning method, therefore, six interpolation pixels $a_{11}$, $a_{12}$, $a_{21}$, $a_{22}$, $a_{31}$ and $a_{32}$ have to be obtained based on pixels $p_{11}$ to $p_{33}$ of the 3×3 pixel pattern.

For example, interpolation pixel value $a_{11}$ can be obtained using pixel $p_{11}$ and pixel $p_{12}$ from the following expression $$a_{11}=(p_{11}+p_{12})/2$$

Other interpolation pixel values can be obtained from the same expression using two adjacent pixel values.

According to the fifth pixel interpolation technique, as described above, when the original image is one by the interlaced scanning method, pattern-matching images can be generated by a simple method, therefore, the processing time can be considerably reduced while the detection accuracy in the transverse direction is maintained.

By applying the first to fifth pixel interpolation techniques, described above, to a case where left and right pattern-matching images are generated from left and right original images photographed by a stereo camera, processing time can be reduced while the resolution in the pattern-matching processing is maintained.

According to the present invention, as described above, when pattern matching is performed, a pattern-matching processing method is adopted in which the original image is interpolated with pixels and pattern-matching images are generated, therefore, the period of time required for pattern-matching processing can be reduced while the resolution of the images is maintained, and as a result, it is no longer necessary to provide a storage memory to store the pattern-matching images, which are the original images interpolated with pixels.

Moreover, by applying the pattern-matching processing method according to the present invention to a stereoscopic distance measuring system, the accuracy in distance measurement can be improved.

In the pattern-matching processing method according to the present invention, after the parallax position is specified approximately, pattern-matching images regarding the position are generated by pixel interpolation and then pattern matching is performed, therefore, for example, only 100 images of 3×3×2 have to be processed compared to a case where two 640×480 images must be processed in a conventional pixel interpolation technique, and as a result, the processing time required for replacing the whole of the original image with the images interpolated with pixels can be reduced.

In addition, in the pattern-matching processing method according to the present invention, after the parallax position is specified approximately, only a right pattern-matching image regarding the position is generated by pixel interpolation and then pattern matching is performed, therefore, for example, only 100 images of 3×3 have to be processed compared to a case where a 640×480 image has to be processed in a conventional pixel interpolation technique, and as a result, the processing time required for replacing the whole of the original image with the images interpolated with pixels can be reduced.

Moreover, in the pattern-matching processing method according to the present invention, when pixel interpolation is performed on the pixel patterns cut out from the original images and pattern-matching images are generated, interpolation pixel values are obtained by weighting the peripheral pixels and averaging them, therefore, errors due to pixel interpolation can be lessened.

In the pattern-matching processing method according to the present invention, when pixel interpolation is performed on the pixel patterns cut out from the original images and pattern-matching images are generated, interpolation pixel values are obtained as an average value calculated from only the upper, lower, left and right pixels that really exist, therefore, the range in which pixel interpolation can be performed is widened and an accurate pixel interpolation can be performed.

Particularly, when the image photographed by a stereo camera is one by the interlaced scanning method, pixel interpolation is performed based on the pixels that really exist on the left and right sides and pattern-matching images are generated, therefore, an accurate pixel interpolation can be realized.

By using an image processing apparatus, in which the above-mentioned pattern-matching processing method according to the present invention has been applied to a stereoscopic distance measuring system, the distance to an object ahead of the vehicle can be detected with accuracy and the pattern-matching processing time required for detection can be reduced, therefore, it is possible to swiftly provide accurate distance information for driving support and warning and safe driving of the vehicle is promoted.

In this specification, description is made with the left-hand side and the right-hand side being clearly defined such as a left image, right image, left area, right area, and so on, to give a clear description and avoid complexity, but the operations are the same even if the left-hand side and the right-hand side are switched, and it is clear that such a case is also included in the present invention.

What is claimed is:

1. A pattern-matching processing method, comprising:
   an area generating step for generating a left area and a right area each having a given range from a left image and a right image photographed in stereo;
   a pixel interpolating step for generating an interpolation pixel between pixels of a plurality of pixels included respectively in the left area and the right area, wherein the pixel interpolating step includes performing a first pixel interpolation between two first adjacent pixels along a first direction in the left area and in the right area, and performing a second pixel interpolation between two second adjacent pixels along a second direction perpendicular to the first direction, wherein the second pixel interpolation includes calculating an average value of plural pixels surrounding a position to be interpolated, wherein the plural pixels include both interpolated pixels and non-interpolated pixels, and wherein in calculating the average value, the interpolated pixels among the plural pixels surrounding the position to be interpolated are assigned a weight less than the weight given to the non-interpolated pixels; and
   a pattern matching step for performing pattern matching using the left area interpolated with the corresponding interpolation pixels and the right area interpolated with the corresponding interpolation pixels.

2. A pattern-matching processing method, as set forth in claim 1, wherein said first and second pixel interpolations are performed on said left area and said right area containing a number of pixels surrounding a matching position specified by the pattern matching step based on an original left area and an original right area.

3. A pattern-matching processing method, comprising:
   an area generating step for generating a left area and a right area each having a given range from a left image and a right image photographed in stereo;
   a pixel interpolating step for generating an interpolation pixel between pixels of a plurality of pixels included in either the left area or the right area, wherein the pixel interpolating step includes performing a first pixel interpolation between two first adjacent pixels along a first direction in the left area or in the right area, and performing a second pixel interpolation between two adjacent pixels along a second direction perpendicular to the first direction, wherein the second pixel interpolation includes calculating an average value of plural pixels surrounding a position to be interpolated, wherein the plural pixels include both interpolated pixels and non-interpolated pixels, and wherein in calculating the average value, the interpolated pixels among the plural pixels surrounding the position to be interpolated are assigned a weight less than the weight given to the non-interpolated pixels; and
   a pattern matching step for performing pattern matching using the area interpolated with the corresponding interpolation pixel and the area without interpolation pixels.

4. A pattern-matching processing method, as set forth in claim 3, wherein said first and second interpolations are performed on said left area and said right area containing a number of pixels surrounding a matching position specified by the pattern matching step based on an original left area and an original right area.

5. A pattern-matching processing method, as set forth in claim 1, wherein said second pixel interpolation is performed starting from a pixel position at which a number of the pixels surrounding the position to be interpolated is largest, for which the average value is calculated.

6. An image processing apparatus measuring a distance to an object that is photographed as images, by performing pattern-matching processing based on left and right images photographed by a stereo camera, comprising:
   an area generating unit for generating a left area and a right area each having a fixed range from the left image;
   a pixel interpolating unit for generating an interpolation pixel between pixels of a plurality of pixels included respectively in the left area and the right area, wherein the pixel interpolating step includes performing a first pixel interpolation between two first adjacent pixels along a first direction in the left area and in the right area, and performing a second pixel interpolation between two second adjacent pixels along a second direction perpendicular to the first direction, wherein the second pixel interpolation includes calculating an average value of plural pixels surrounding a position to be interpolated, wherein the plural pixels include both interpolated pixels and non-interpolated pixels, and wherein in calculating the average values, the interpolated pixels among the plural pixels surrounding the position to be interpolated are assigned a weight less than the weight given to the non-interpolated pixels; and
   a pattern-matching processing unit having a pattern-matching unit performing pattern matching based on the left area interpolated with the corresponding interpolation pixels and the right area interpolated with the corresponding interpolation pixels, or based on one of the areas without pixel interpolation and the other area interpolated with the corresponding interpolation pixels.

7. An image processing apparatus, as set forth in claim 6, wherein said pixel interpolating unit performs pixel interpolation on the left area and the right area containing a number of pixels surrounding a matching position specified by the pattern matching step based on an original left area and an original right area.

8. An image processing apparatus, as set forth in claim 6, wherein said pixel interpolating unit performs pixel interpolation on the right area containing a number of pixels surrounding a matching position specified by the pattern matching step based on an original left area and an original right area.

9. An image processing apparatus, as set forth in claim 6, wherein said pixel interpolating unit performs pixel interpolation starting from a pixel position at which a number of the pixels surrounding the position to be interpolated is largest, for which the average value is calculated.

10. A pattern-matching processing method, as set of forth in claim 3 or 4, wherein said second pixel interpolation is performed starting from a pixel position at which a number of the pixels surrounding a position to be interpolated is largest, for which the average value is calculated.

11. An image processing apparatus measuring a distance to an object that is photographed as images, by performing pattern-matching processing based on left and right images photographed by a stereo camera, comprising;
   an area generating unit for generating a left area and a right area each having a fixed range from the left image;
   a pixel interpolating unit for generating an interpolation pixel between pixels of a plurality of pixels included in respectively the left area and the right area, wherein the pixel interpolating step includes performing first pixel interpolation between two first adjacent pixels along a first direction in the left area and in the right area, and performing a second pixel interpolation between two second adjacent pixels along a second direction perpendicular to the first direction, wherein the second pixel interpolation includes calculating an average value of plural pixels surrounding a position to be interpolated, wherein the plural pixels include both interpolated pixels and non-interpolated pixels, and wherein in calculating the average value, the already interpolated pixels among the plural pixels surrounding the position to be interpolated are assigned a weight less than the weight given to the non-interpolated pixels; and a pattern-matching processing unit having a pattern-matching unit performing pattern matching based on the left area interpolated with the corresponding interpolation pixels and the right area interpolated with the corresponding interpolation pixels, or based on one of the areas without pixel interpolation and the other area interpolated with the corresponding interpolation pixels; and a distance measuring unit for calculating the distance from the difference in positions of the left image and the right image based on a matching position specified by performing pattern matching on the left area and the right area.

* * * * *

UNITED STATES PATENT AND TRADEMARK OFFICE
CERTIFICATE OF CORRECTION

PATENT NO. : 7,386,192 B2
APPLICATION NO. : 10/632583
DATED : June 10, 2008
INVENTOR(S) : Akihiro Oota It is certified that error appears in the above-identified patent and that said Letters Patent is hereby corrected as shown below:

In the Claims

Column 20, line 22, Claim 6      Delete "values", Insert --value--

Column 20, line 52, Claim 10      After "set", Delete "of"

Signed and Sealed this

Eighteenth Day of November, 2008

JON W. DUDAS
*Director of the United States Patent and Trademark Office*